D. S. KENNEDY.
TYPOGRAPHICAL MACHINE.
APPLICATION FILED FEB. 19, 1914.

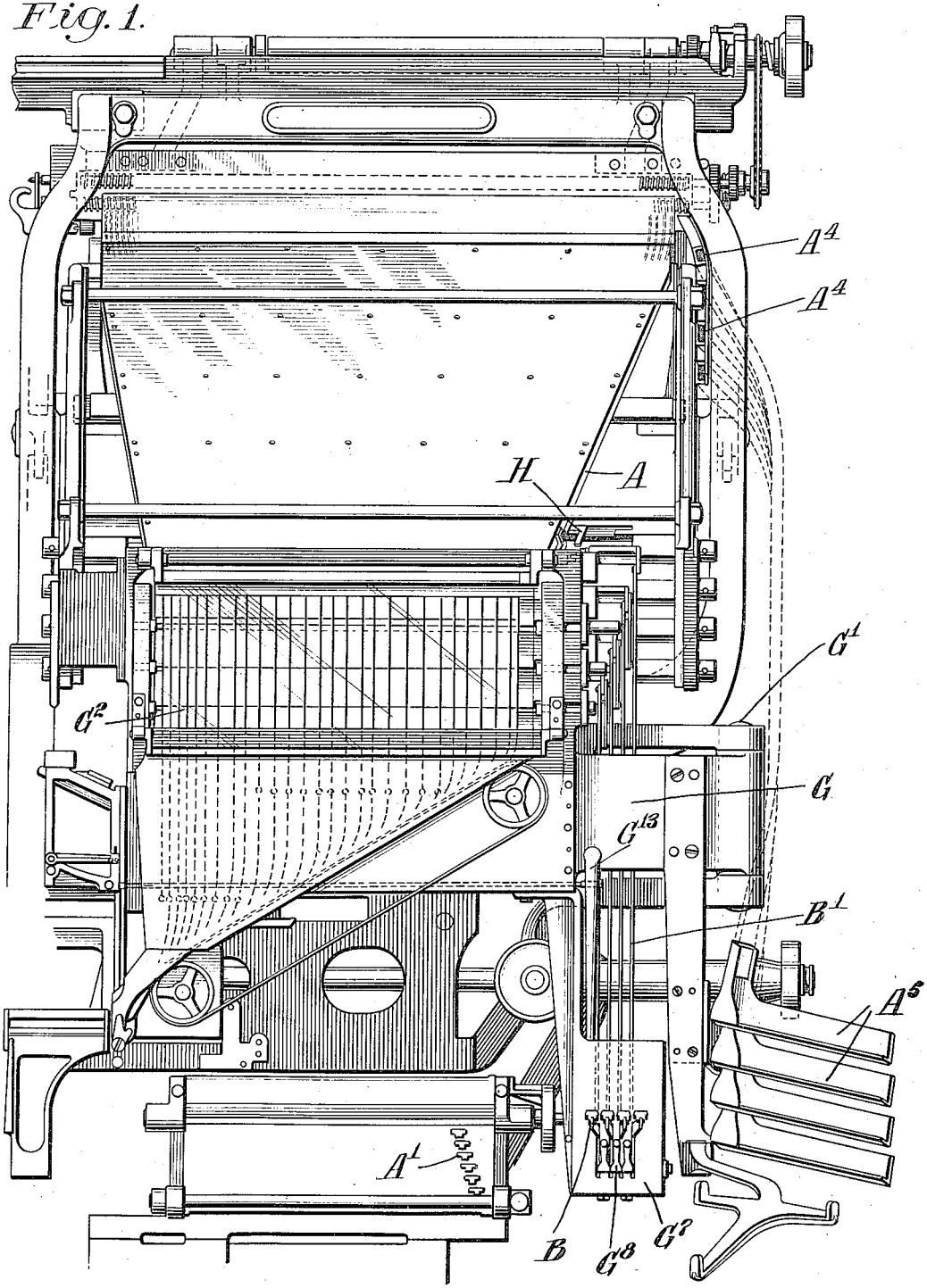

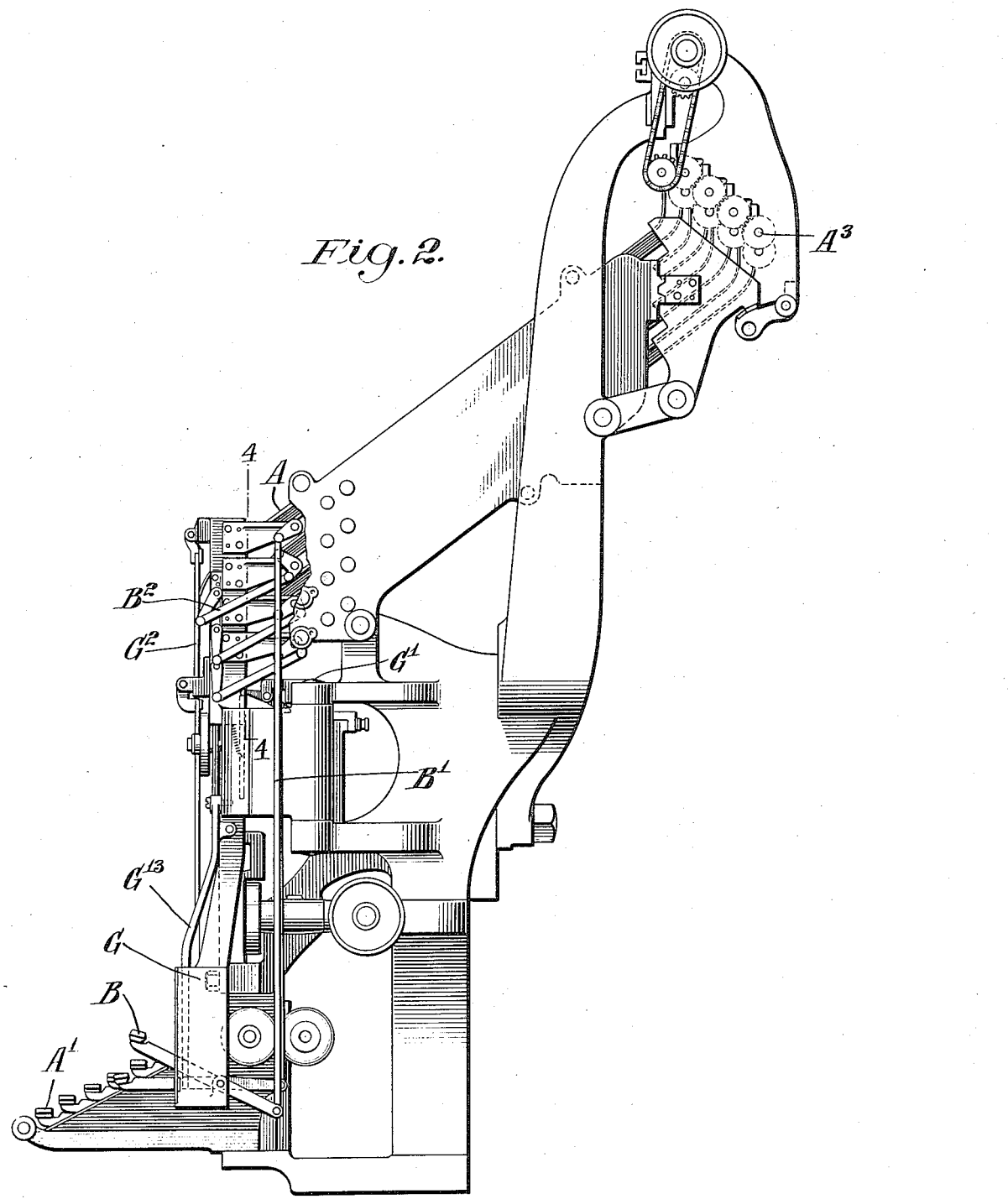

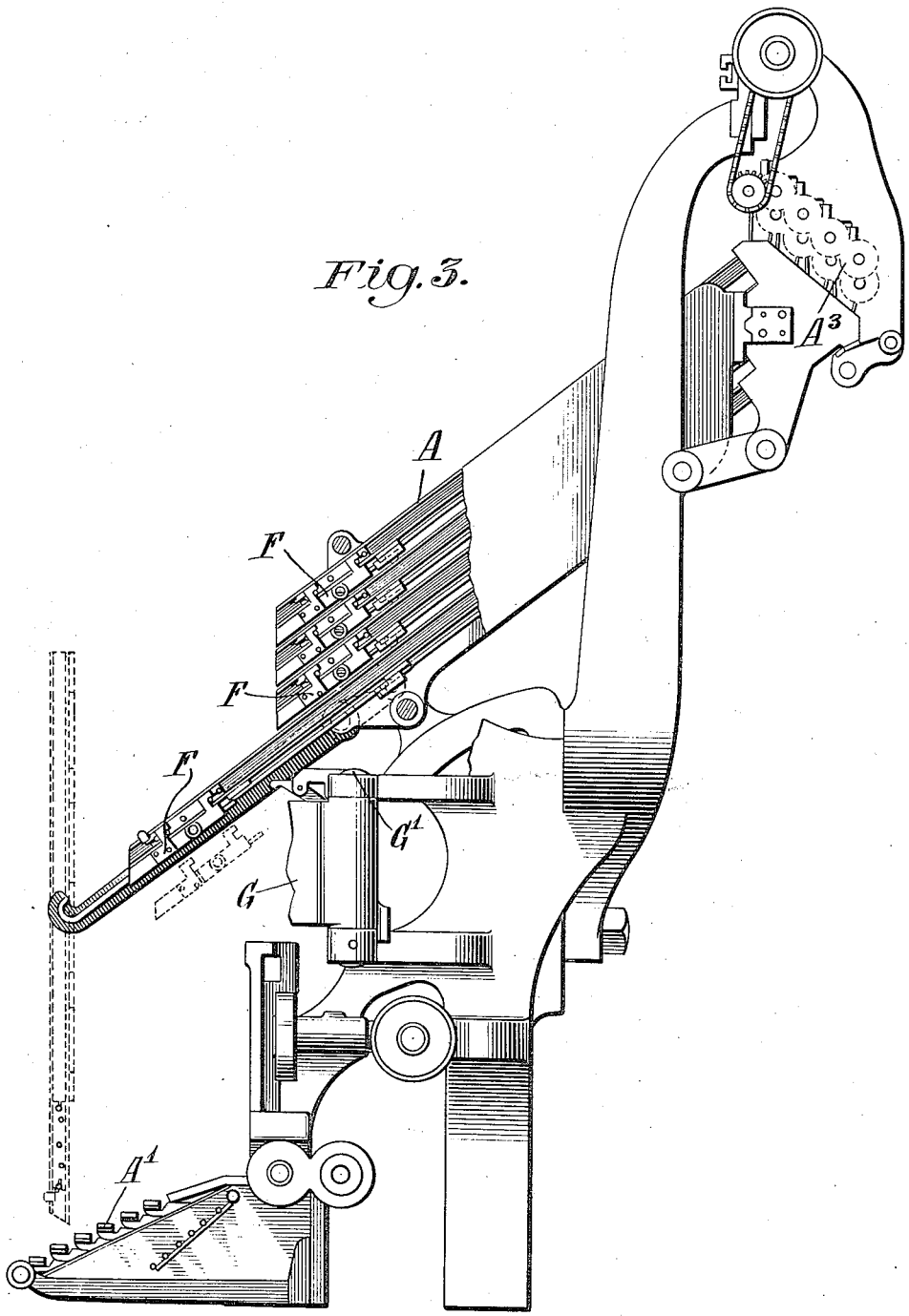

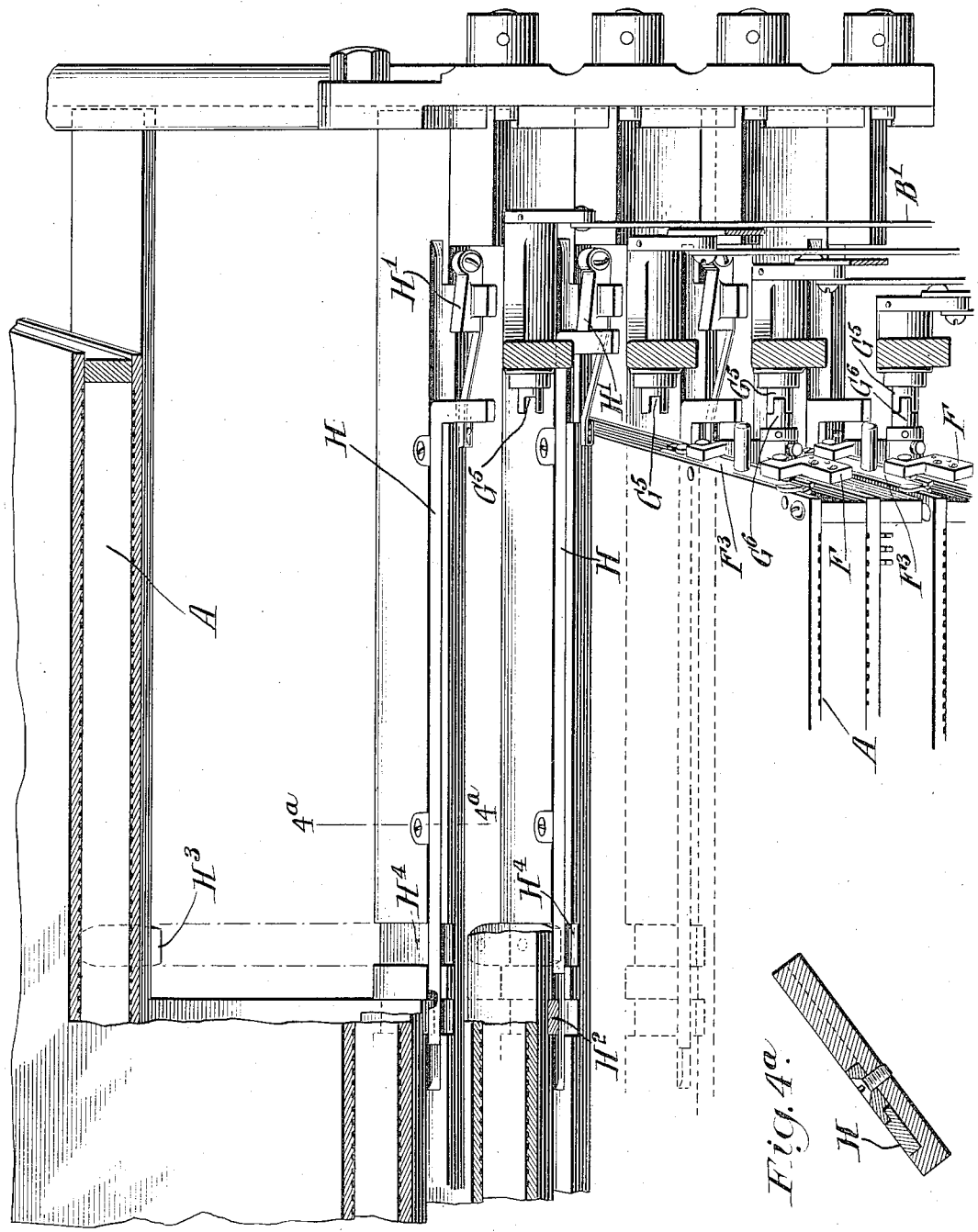

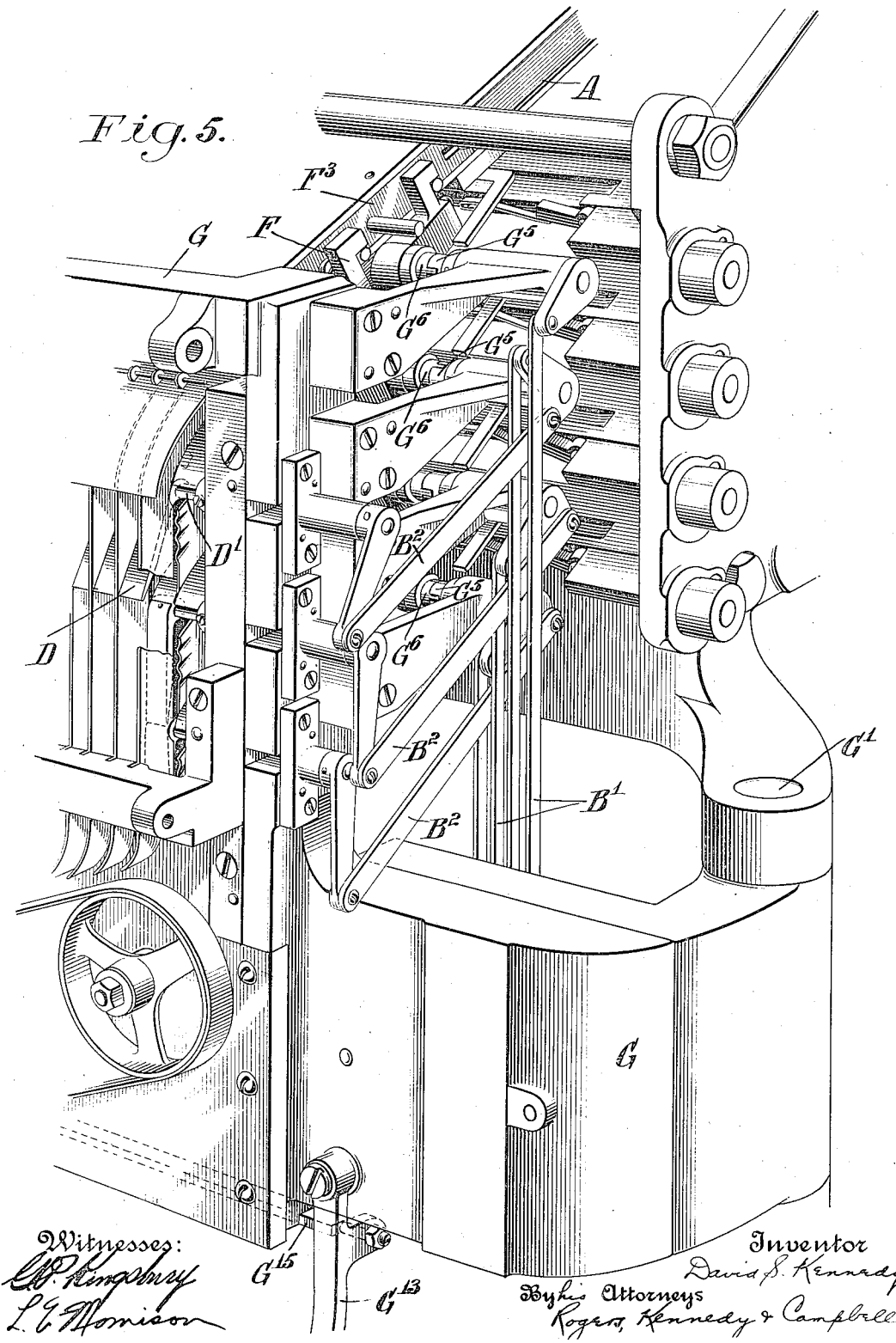

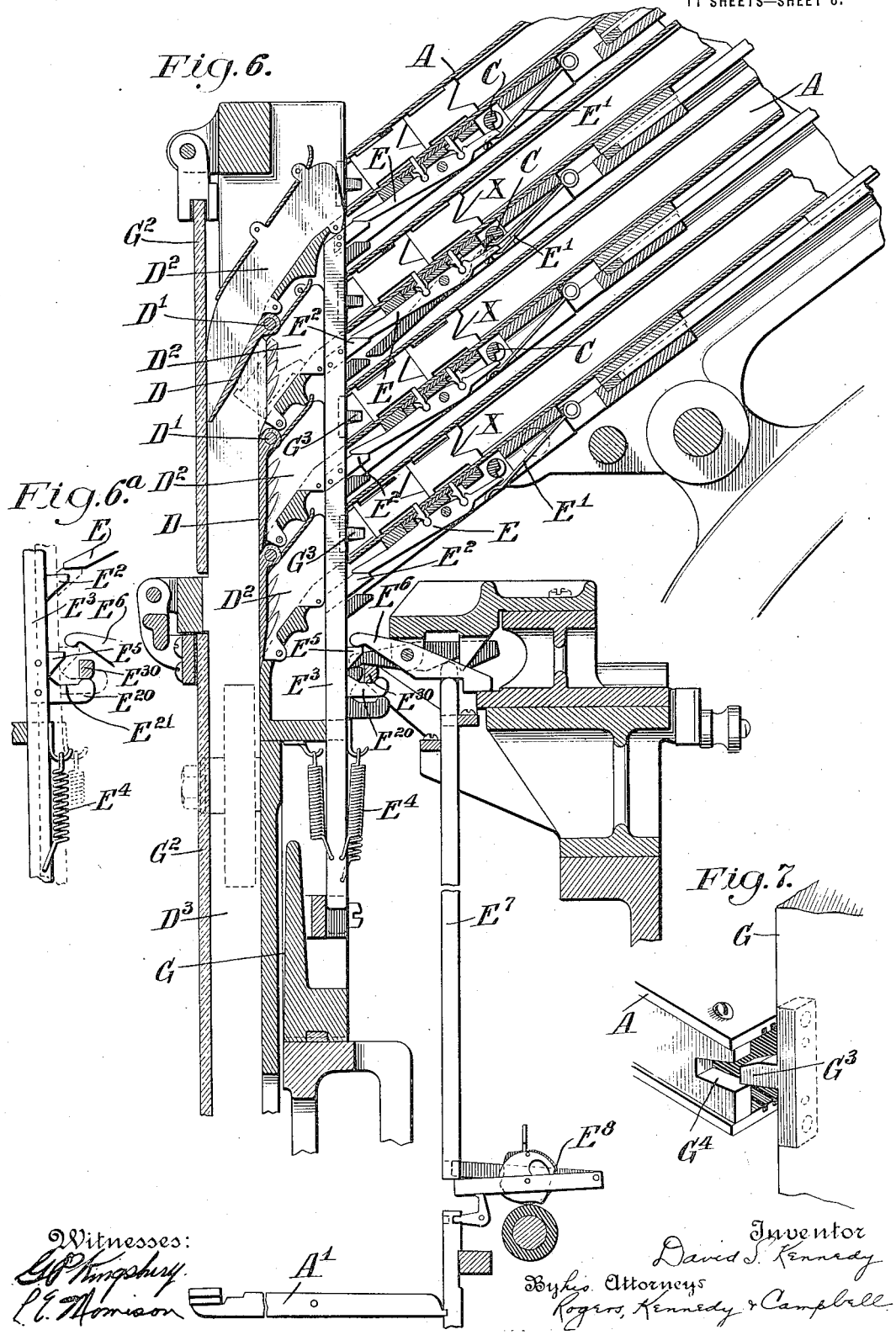

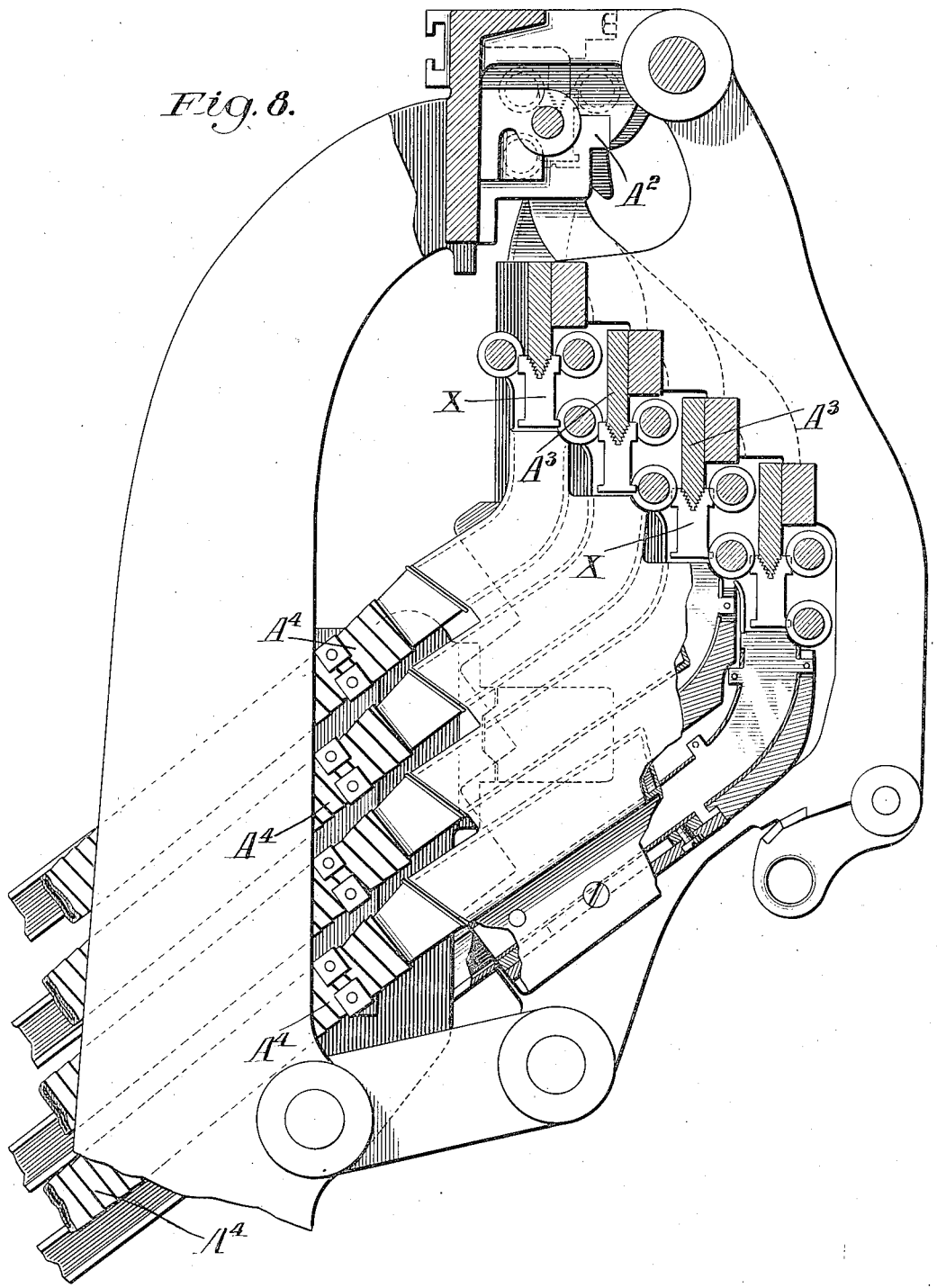

1,193,558.

Patented Aug. 8, 1916.
11 SHEETS—SHEET 8.

Witnesses:

Inventor
David S. Kennedy
By his Attorneys
Rogers, Kennedy & Campbell

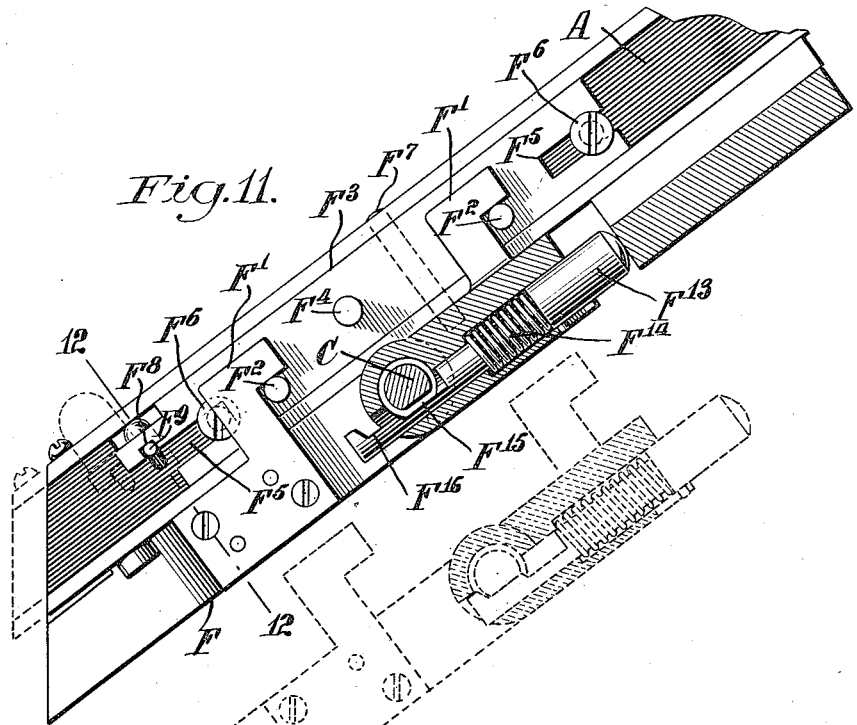
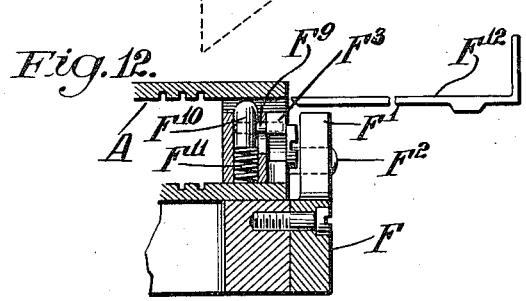
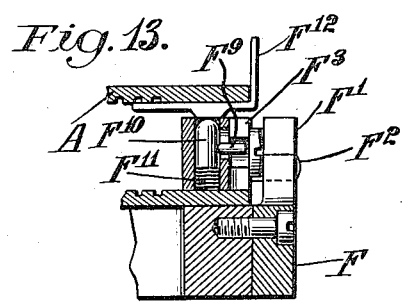
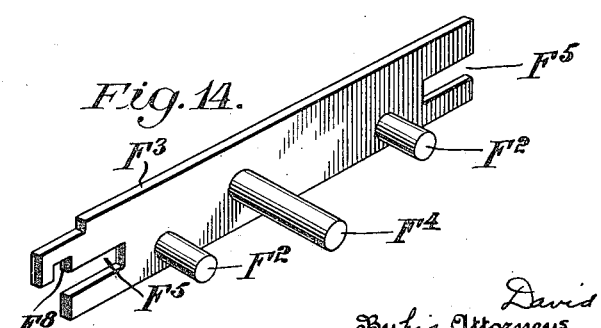

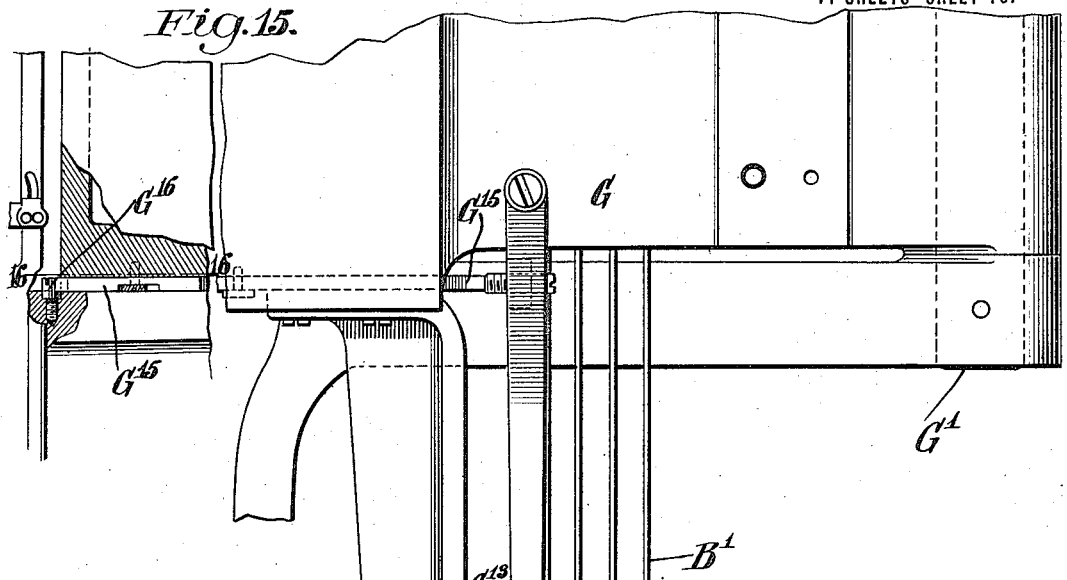
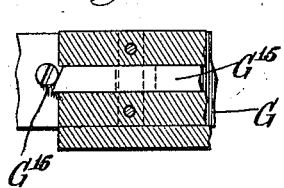
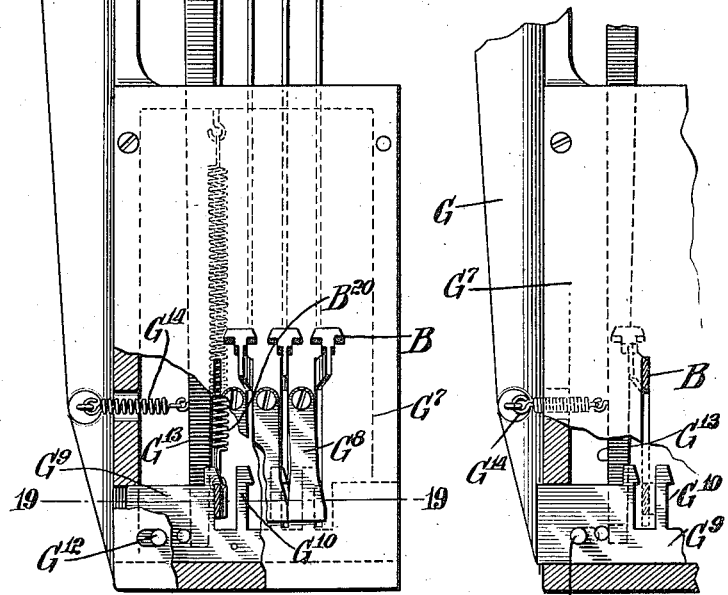
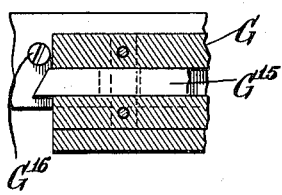
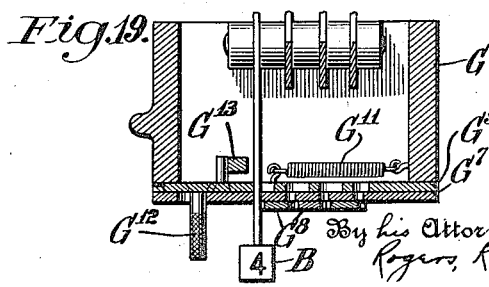

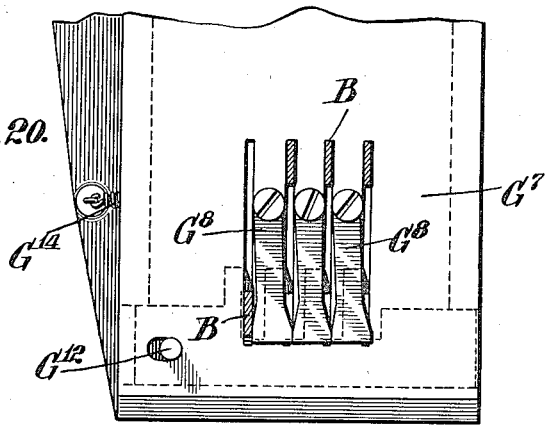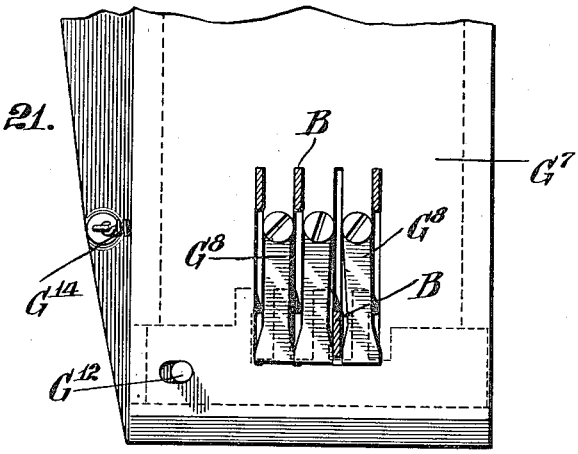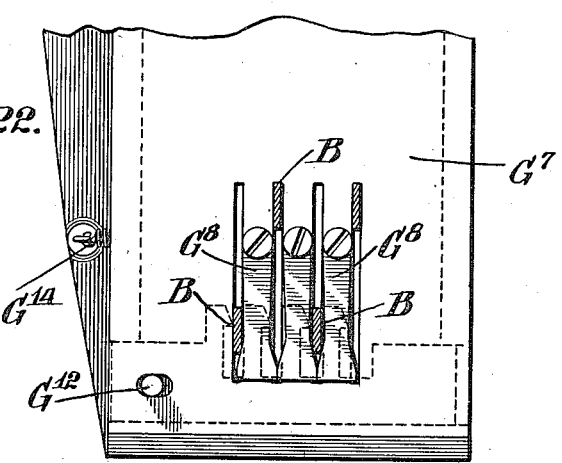

UNITED STATES PATENT OFFICE.

DAVID S. KENNEDY, OF BROOKLYN, NEW YORK, ASSIGNOR TO MERGENTHALER LINOTYPE COMPANY, A CORPORATION OF NEW YORK.

TYPOGRAPHICAL MACHINE.

1,193,558.  Specification of Letters Patent.  Patented Aug. 8, 1916.

Application filed February 19, 1914. Serial No. 819,605.

*To all whom it may concern:*

Be it known that I, DAVID S. KENNEDY, a citizen of the United States, residing at Brooklyn, in the county of Kings and State of New York, have invented certain new and useful Improvements in Typographical Machines, of which the following is a specification, reference being had therein to the accompanying drawing.

My invention relates to typographical machines, such as linotype machines of the general organization represented in Letters Patent of the United States, No. 436,532, to O. Mergenthaler, wherein circulating matrices are released from a magazine in the order in which their characters are to appear in print and then assembled in line, the composed line transferred to the face of a mold, the mold filled with molten metal to form a slug or linotype against the matrices which produce the type characters thereon, and the matrices thereafter returned through distributing mechanism to the magazine from which they started. More particularly, it relates to that form thereof embodying a plurality of magazines, containing matrices of different style or font, and any one of which may be brought into action as desired.

In the accompanying drawings, I have shown my improvements in preferred form and by way of example, and as applied to the kind of linotype machines generally disclosed in my Letters Patent, No. 1,126,029, dated January 26, 1915, but obviously many changes and variations may be made therein, and in their mode of application, which will still be comprised within their spirit. Thus they may be applied to typographical machines of other kinds, such as typesetters and typecasters, or those which handle type or dies, instead of matrices. Generally speaking, I desire it to be understood that I do not limit myself to any specific form or embodiment, except in so far as such limitations are specified in the claims.

Figure 9:
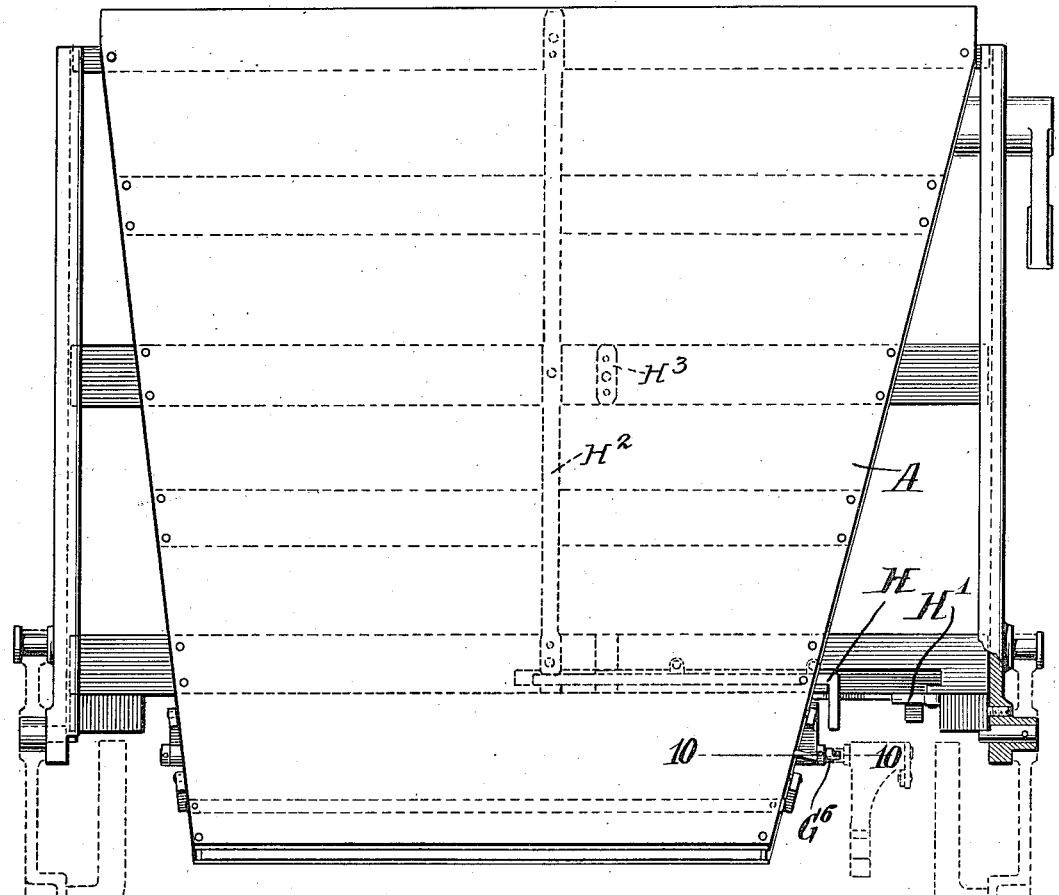
Figure 10:
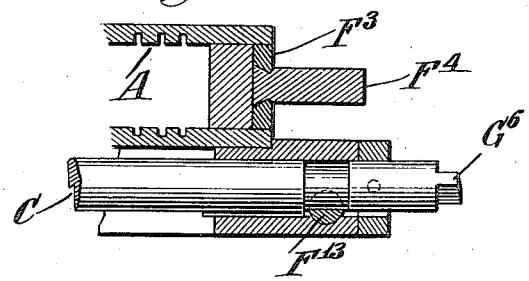

Referring to the drawings: Figure 1 is a front elevation of a portion of a linotype machine embodying my invention; Fig. 2 is a side elevation, partly broken away; Fig. 3 is a side elevation, partly in section; Fig. 4 is a vertical section on the line 4—4 of Fig. 2; Fig. 4$^a$ is a sectional detail on the line 4$^a$—4$^a$ of Fig. 4; Fig. 5 is an enlarged perspective of certain of the parts; Fig. 6 is a vertical section through the front plate, magazine, etc.; Fig. 6$^a$ is a detached detail; Fig. 7 is a perspective detail of the magazine registering means; Fig. 8 is a side elevation, partly in section and broken away, of certain of the parts; Fig. 9 is a top view of a magazine and its supporting means; Fig. 10 is a sectional detail on the line 10—10 of Fig. 9; Fig. 11 is a side elevation, partly in section, of the bank of escapements, etc.; Fig. 12 is a sectional detail on the line 12—12 of Fig. 11; Fig. 13 is a similar view showing the parts in different relation; Fig. 14 is a perspective of the bank supporting plate; Fig. 15 is a front elevation of a portion of the swinging frame, etc., partly broken away; Fig. 16 is a sectional detail on the line 16—16 of Fig. 15; Fig. 17 is a similar view showing the parts in different relation; Fig. 18 is a detail view somewhat similar to Fig. 15; Fig. 19 is a sectional detail on the line 19—19 of Fig. 15; and Figs. 20, 21 and 22 are detail front views illustrating the controlling means for the font selecting keys, the parts being shown in different positions.

The matrices X are stored in the several magazines A, four of which are shown for purposes of illustration, and their release therefrom is effected by the manipulation of the keys A$^1$, when they are delivered to the assembling means, and thence to the casting mechanism, and finally elevated and transferred to the distributing mechanism. The latter comprises (Fig. 8) the font separating means A$^2$, from which the matrices are delivered to the respective main distributers A$^3$, by which they are restored to their own channels in the magazines A. The parts so far described are or may be of any appropriate or well known form of construction, such as those employed in the commercial "model 9" linotype, and in themselves constitute no part of my present invention. When sorts or extra matrices are employed, they are delivered according to font to a main distributer and conveyed therethrough, and then pass through the sorts tube $A^4$ to the stacking device or receptacle $A^5$. It will be noted that in the present instance I employ such a tube and receptacle for each of the magazines (Figs. 1 and 8).

As in my previously mentioned patent, any selected one of the magazines may be brought into use by the manipulation of a font-selecting key B, which through connections $B^1$ moves the rock shaft C of the corresponding magazine to unlocking position, and through connections $B^2$ opens the flap D mounted upon the rock shaft $D^1$, so that matrices may pass from the selected magazine (Fig. 6) through the corresponding throat $D^2$ into the vertical raceway $D^3$. The reverse movement of the actuating connections $B^1$ is effected by the spring $B^{20}$, (Fig. 15) so that when the key B is released, the rock shaft C will be restored to locking engagement with the escapements and the flap D closed to insure the continuity of the raceway. As the keys B are so arranged that the operation of one of them causes the release of a previously operated one, all as in said application, it follows that the selection of a given magazine automatically effects the locking of the escapements and the closing of the flaps of all the other magazines.

Each of the magazines A is provided with its own series of escapements E (see Fig. 6), the latter being engaged by springs $E^1$ normally tending to release the extreme matrices X. Each series of escapements of the different magazines lying in the same vertical plane is controlled by a single actuating member $E^3$, formed with projections $E^2$ located in position to engage beneath the outer end of the several escapements E, the member $E^3$ being provided with a spring or springs $E^4$ of sufficient strength to overcome the escapement springs $E^1$ and maintain the member $E^3$ normally in its uppermost position. The depression of the member would release all of the escapements, were it not for the fact that all of them except one are held against action by the rock shafts C, and accordingly matrices are delivered only from the selected magazine. The member $E^3$ is also formed with a projecting portion $E^5$ located in position to engage the lever $E^6$, which in turn is connected by a reed $E^7$ to the ordinary keyboard mechanism $E^8$, all in the manner well understood in the art, so that the operation of the corresponding key $A^1$ first effects the depression of the member $E^3$ and the release of a matrix from the selected magazine, and then frees the member $E^3$ so that the spring $E^4$ may restore it to its original position.

In Fig. 6, the second magazine is shown in action, with its rock shaft C turned to unlocking position to permit the actuation of the escapements E, and with its flap D open, so that the released matrices may pass through the throat $D^2$ into the raceway $D^3$; and the other magazines are shown with their rock shafts C in locking position, and with the flaps D of the magazines below the operative one closed so as to secure the continuity of the raceway.

The machine is provided with a front or frame G pivotally mounted as at $G^1$, in a manner somewhat similar to that disclosed in U. S. Letters Patent to J. R. Rogers, No. 930,693, so that the frame or front, together with the connected parts, may be swung outwardly to give access to the interior, as to permit the interchange of magazines. Connected to the frame G, and consequently movable therewith, are the font selecting keys B and their interconnections; the connections $B^{1r}$ which actuate the stationarily mounted rock shafts C; the flaps $D^2$, their rock shafts $D^1$, and the connections $B^2$ which open and close the flaps; the front plate $G^2$ formed with the vertical raceway $D^3$ and the individual throats $D^2$ leading from the magazines thereto; and the escapement actuating members $E^3$, the latter parts being so arranged that the outward movement of the frame G disconnects the projections $E^2$ from the escapements E, and the projections $E^5$ from the operating levers $E^6$, and so that the inward movement of the frame restores the connections. To afford the necessary clearance and thus prevent collision between the projections $E^2$ and $E^5$ and the escapements E and levers $E^6$ respectively, as the frame G swings to operative position, means are provided to depress the members $E^3$ slightly at this time. These means (Figs. 6 and $6^a$) comprise the arms $E^{20}$ on the members $E^3$, arranged to contact with the fixed bar $E^{30}$. The arms $E^{20}$ are formed with depressions $E^{21}$, the parts being so located and arranged that as the frame G moves inwardly, the ends of the arms contact with the bar and depress the members $E^3$, as shown by full lines in Fig. $6^a$, and when the frame is moved to its final position, the depression $E^{21}$ will come beneath the bar, thereby permitting the upward movement of the members to normal position, as indicated by dotted lines. The frame G is also provided with inwardly projecting beveled or inclined projections $G^3$ (Figs. 6 and 7) adapted to engage similarly formed notches $G^4$ in each of the magazines, so that the inward movement of the frame effects the individual leveling of the magazines and secures the proper registry of the parts when in operative condition.

As the rock shafts C are connected to the stationary magazines A, means are provided to effect their automatic engagement with and disengagement from the actuating means B¹. These means (Figs. 4, 5, 9 and 10) comprise tongues G⁶ upon the rock shafts C and the correspondingly grooved actuating heads G⁵ upon the frame G, the parts being so arranged that when the rock shafts are in their locking position, the tongues and grooves will be horizontal, so that the inward and outward movements of the frame effect respectively their engagement and disengagement without requiring special attention on the part of the operator.

As previously stated, the font selecting keys B are mounted upon and carried by the movable frame G, their arrangement and interconnection being best illustrated in Figs. 15 to 22. As in my previous patent, the keys B are operable in the vertically-slotted plate G⁷, and are held in operated position against the force of the connected springs B²⁰ by the plate G⁹, which is formed with the hooks or detents G¹⁰ to engage the keys. The spring G¹¹ holds the plate G⁹ normally in engaging relation, and the hooks G¹⁰ are beveled so that the operation of a second key releases a previously operated one, and thus effects the locking of the escapements and the closing of the flaps in all of the magazines except the one last selected.

Means are also provided whereby the outward movement of the frame G releases an operated key, and thus insures the locking of the escapements and the closing of the flaps in all the magazines, whenever the frame is shifted from normal position, as for instance to permit the removal of a magazine. These means comprise the lever arm G¹³ pivoted to the frame and arranged to engage the plate G⁹ and move it to releasing position against the force of the spring G¹¹, the arm G¹³ being provided with the stronger spring G¹⁴, which when it is permitted to act thus shifts the plate G⁹. Slidably mounted in the frame G is the link G¹⁵, connected at one end to the arm G¹³ and with its other end beveled and located in position to be engaged and moved longitudinally by the fixed stop G¹⁶ on the stationary framework, when the frame G is closed. When the parts are in this position (Figs. 15 and 16), the link holds the arm G¹³ inwardly against the force of the spring G¹⁴, and the spring G¹¹ acts to maintain the plate G⁹ in engaging relation to an operated key B. But when the frame G moves outwardly (Figs. 17 and 18), the end of the link is moved out of engagement with the stop G¹⁶, whereupon the spring G¹⁴ acts through the arm G¹³ to shift the plate G⁹ to inactive position, thus releasing any key B held thereby.

It will be understood that the various automatic operations above described may be performed in other ways or by different means, one of the essential ideas being to insure the locking of the type or matrices in all the magazines when the escapements and their actuating members are disconnected, as otherwise the type or matrices would be allowed to escape from one or more of the magazines. As will have been already noted, this disconnection takes place either when the escapement actuating members are shifted longitudinally from their normal position on the supporting frame or when the frame itself is swung outwardly, although in the present instance both of these operations are carried out substantially simultaneously, the longitudinal shifting of the actuating members being effected by the initial movement of the frame. It will be obvious, however, that these features are not necessarily interdependent, as one might be embodied in a machine without the other. Thus herein the longitudinal shifting of the escapement actuating reeds might be dispensed with, although it constitutes a very advantageous feature in that it permits the free outward movement of the supporting frame and avoids any danger of the parts binding or becoming bent or broken.

It is also desirable that all of the magazines be placed in inactive position at certain other times, and without opening the frame G, as for instance when the operator leaves the machine. To this end the plate G⁹ is provided with a projecting finger piece G¹², whereby he may at will conveniently shift the plate to inactive position.

Means are also provided to prevent the operation of more than one font selecting key at a time, as best illustrated in Figs. 20, 21 and 22. These means preferably comprise a series of parallel members G⁸, pivotally mounted on the front of the plate G⁷ and disposed beneath and between the keys B, and so as to be shifted thereby. The members G⁸ are so arranged as to be each capable of a limited lateral movement, the aggregate of such movement being sufficient only to permit the operation of a single key B. Thus in Fig. 20 the first key is shown as operated, and in Fig. 21 the third key is so illustrated. Fig. 22 shows the attempted operation of two keys simultaneously, but due to the limited lateral movement of the members G⁸, neither can be brought to its lower or operative position. Through these simple devices, it becomes impossible to render more than one magazine active at a time.

In order to permit the ready attachment and detachment of the escapements to and from their respective magazines, they are arranged in banks F provided with suitable connecting means, which are best disclosed in Figs. 11, 12, 13 and 14. Each bank is formed at its opposite ends with a pair of upwardly projecting hooks F¹, designed to engage a corresponding pair of supporting pins F² located on the plates F³ at the sides of the magazine A. The plate F³ is formed at its ends with notches F⁵ adapted to engage the projecting studs F⁶ on the magazine, whereby a limited sliding movement of the plate F³ is permitted to allow the engagement and disengagement of the pins F² and hooks F¹, the plate being further formed with a finger piece F⁴ to facilitate this adjustment. When the bank F is in operative position (Fig. 11) it is securely held therein by the transverse dowel pin F⁷.

In order to prevent the detachment of a bank of escapements before the matrices are properly locked in the magazine, means are provided to hold the plate F³ against movement until the customary bar or strip F¹² is inserted transversely of the magazine to engage and hold the lowermost matrices. To this end, the plate F³ is formed with a notch F⁸ adapted to be engaged by a pin F⁹ upon the plunger F¹⁰, which is normally pressed into engaging position by the spring F¹¹. When the parts are in these relations (Figs. 11 and 12), the engagement of the pin with the notch holds the plate against movement. Before the latter can be adjusted, it is necessary to insert the matrix locking bar F¹² (Fig. 13), which acts to depress the plunger and remove the pin from the notch, thus allowing the shifting of the plate and the detachment of the bank of escapements.

The previously mentioned rock shaft C which is employed to lock and unlock the escapements, is also carried by the bank F, and means are provided to hold it in locking position and against turning both when the magazine is removed from its operative position in the machine and when the bank is moved out of operative relation to the magazine. These means (Figs. 10 and 11) comprise the plunger F¹³ located beneath and transversely to the shaft C and formed with two cuts or depressions, one F¹⁵ of such depth as to allow the free turning of the shaft, and the other F¹⁶ of less depth and adapted to engage a cutaway portion of the shaft. The plunger F¹³ is normally urged to its locking position by the spring F¹⁴, but when the magazine is in its operative position in the machine and with the bank F connected thereto (Fig. 11), the end of the plunger contacts with the frame and it is shifted rearwardly to bring the deeper depression F¹⁵ into relation to the shaft, at which time the latter may be freely turned. However, when the magazine is removed from its operative position or when the bank F is detached therefrom, as shown by dotted lines in Figs. 3 and 11 respectively, the spring F¹⁴ moves the plunger longitudinally and brings the cut F¹⁶ into engagement with the shaft, which is thereby locked.

The several inclined magazines A are detachably secured in the frame, to permit their ready removal and replacement. Each is held in position by a slide H (Figs. 4, 4ª and 9), which normally lies in front of the longitudinal rib H² on the bottom of the magazine, in a manner substantially similar to that disclosed in U. S. Letters Patent to R. M. Bedell, No. 1,076,184. However, in the present instance, I also provide a movable stop or catch H¹ to arrest the slide H in an intermediate position, when desired. For instance, in Fig. 4, the second slide H is shown as partially withdrawn and in contact with the stop H¹, which withdrawal frees it from engagement with the rib H², but leaves it in position across the groove H⁴ in the framework to engage the rearwardly-located and downwardly-projecting stop H³ on the magazine, this latter stop being situated out of alinement with the rib H². In other words, the partial withdrawal of the slide H permits the forward movement of the magazine and then arrests it, as indicated in connection with the lowermost magazine in Fig. 3. In this position, the escapement bank F may be conveniently attached or detached, as indicated by dotted lines. The magazine may then be restored to normal position, or if desired may be entirely removed from the machine by the further withdrawal of the slide H, which is effected by swinging the catch H¹ out of engaging relation.

As previously stated, I have shown my improvements only in preferred form and by way of example, and as applied to a linotype machine, but obviously many modifications and alterations therein, and in their mode of application, will suggest themselves to those skilled in the art, without departure from the scope of the invention.

Having thus described my invention, its construction and mode of operation, what I claim and desire to secure by Letters Patent of the United States is as follows:

1. In a typographical machine, the combination of a plurality of magazines for the type or matrices, escapement mechanism tending to release the type or matrices from all the magazines simultaneously, a series of locking devices, one for each magazine, to prevent the escape of the type or matrices, each of said devices being movable independently to inactive position to permit the escape of the type or matrices from the corresponding magazine, and means for preventing the movement of more than one of said locking devices to inactive position at a time, for the purpose described.

2. In a typographical machine, the combination of a plurality of magazines each provided with an escapement to control the release of the type or matrices therefrom, a common actuating device for the escapements of all the magazines, a series of locking devices, one for each of the escapements, and each of said locking devices being movable independently to inactive position to permit the operation of the corresponding escapement to the exclusion of the others, and means for preventing the movement of more than one of said locking devices to inactive position at a time, for the purpose described.

3. In a typographical machine, the combination of a plurality of magazines, a series of magazine selecting keys, means for locking the keys in their operated position, a movable frame, and mechanism whereby the movement of the frame will automatically effect the release of the operated keys.

4. In a typographical machine, the combination of a plurality of magazines, a series of independently-operable magazine-selecting devices, means for locking said devices in their operated position, a movable frame, and mechanism whereby the movement of the frame will effect the release of the operated devices.

5. In a typographical machine, the combination of a plurality of magazines, a series of shiftable magazine-selecting devices, means for locking said devices in their shifted position, a movable frame, and connections between the frame and locking means to insure the release of the selecting devices when the frame is moved.

6. In a typographical machine, the combination of a magazine provided with a locking device for the type or matrices, the movable channeled front plate $G^2$ to receive the type or matrices from the magazine, and means whereby the movement of the plate will automatically move the locking device to its active position.

7. In a typographical machine, the combination of a plurality of magazines each provided with a locking device for the type or matrices, mechanism whereby the movement of one of said locking devices to inactive position effects the movement of the other locking devices to active position, a movable frame, and means whereby the movement of the frame will automatically restore the inactive locking device to active position while leaving the other locking devices in their active position.

8. In a typographical machine, the combination of a magazine provided with a locking device for the type or matrices, the movable channeled front plate $G^2$ to receive the type or matrices from the magazine, and connections between the plate and locking device to insure the active position of the latter when the former is moved.

9. In a typographical machine, the combination of a plurality of magazines each provided with a locking device for the type or matrices, mechanism whereby the movement of one of said locking devices to inactive position effects the movement of the other locking devices to active position, a movable frame, and connections between the frame and locking devices to insure the return of the inactive device to active position when the frame is moved while leaving the other locking devices in their active position.

10. In a typographical machine, the combination of a plurality of magazines, a series of shiftable magazine-selecting devices, a movable frame, and connections between the frame and the selecting devices to insure the location of said devices in normal position when the frame is moved.

11. In a typographical machine, the combination of a plurality of magazines, a series of shiftable magazine-selecting devices, a movable frame, and means whereby the movement of said frame will automatically restore the selecting devices to their normal position.

12. In a typographical machine, the combination of a plurality of magazines each provided with a locking device to retain the type or matrices therein, operating means for the locking devices, and a frame upon which said operating means are mounted and movable at will from its operative position to disconnect the operating means from the locking devices.

13. In a typographical machine, the combination of a plurality of magazines each provided with a locking device to retain the type or matrices therein, operating means for the locking devices, and a relatively movable frame upon which said operating means are mounted, the said locking devices and operating means being so formed as to be automatically connected and disconnected as the frame is moved into and out of its operative position.

14. In a typographical machine, the combination of a plurality of magazines each provided with a locking device for the type or matrices, a movable frame, operating means for the locking devices mounted upon said frame and adapted to be disconnected from the locking devices by the movement of the frame from operative position, and mechanism whereby the movement of the frame will restore the operating means and locking devices to their normal position preparatory to their disconnection.

15. In a typographical machine, the combination of a magazine provided with a locking device for the type or matrices, an operating member for the locking device, and a movable frame upon which said operating member is mounted, the locking device and operating member being so formed as to be automatically connected and disconnected as the frame moves into and out of operative position.

16. In a typographical machine, the combination of a magazine provided with a locking device for the type or matrices, a movable supporting frame, an operating member for the locking device mounted upon said frame and adapted to be disconnected from the locking device by the movement of the frame from operative position, and mechanism whereby the movement of the frame will restore the locking device and operating member to their normal position preparatory to their disconnection.

17. In a typographical machine, the combination of a magazine, a bank of escapements, and means for supporting the escapements on the magazine, said means being carried permanently by the magazine and movable at will to an inactive position thereon to permit the removal of the escapements.

18. In a typographical machine, the combination of a magazine, a bank of escapements, and a supporting plate permanently carried by the magazine and to which the escapements are connected, the said plate being movably arranged on the magazine so as to break the connection between it and the escapements to permit the removal of the latter.

19. In a typographical machine, the combination of a magazine A, the bank of escapements F provided with the supporting lugs $F^1$, and the plate $F^3$ carried permanently by the magazine and provided with the laterally projecting supporting studs $F^2$ engaged by the lugs, the said plate being movable longitudinally on the magazine to disengage its studs from the escapement supporting lugs.

20. In a typographical machine, the combination of a magazine, a bank of escapements, means for supporting the escapements on the magazine, the said means being carried permanently by the magazine and movable from active position to permit the removal of the escapements, and additional locking means for normally holding the supporting means against movement.

21. In a typographical machine, the combination of a magazine, a bank of escapements detachably carried thereby, a locking device to retain the type or matrices in the magazine, and means to prevent the detachment of the bank from the magazine until the type or matrices have been locked therein.

22. In a typographical machine, the combination of a magazine, a bank of escapements detachably carried thereby, means to prevent the detachment of the bank from the magazine, and a matrix locking device adapted to render said means inactive.

23. In a typographical machine, the combination of a magazine, a bank of escapements detachably carried thereby, means to prevent the detachment of the bank from the magazine, and a matrix locking bar adapted to be inserted in the magazine and serving by its insertion to render said means inactive.

24. The magazine A provided with the longitudinally movable plate $F^7$ formed with the laterally-projecting escapement-supporting studs $F^2$, and the locking pin $F^9$ to hold the plate in its operative position.

25. In a typographical machine, the magazine A provided with the movable escapement-supporting plate $F^3$ and the spring-pressed locking pin $F^9$, together with the matrix retaining bar $F^{12}$ to move the pin to unlocking position.

26. In a typographical machine, the combination of a removable magazine provided with escapements, and means whereby the removal of the magazine will automatically lock the escapements against action.

27. In a typographical machine, the combination of a removable magazine provided with escapements, and means for preventing the operation of the escapements when the magazine is removed, the said means being released automatically by the replacement of the magazine.

28. In a typographical machine, the combination of a removable magazine provided with escapements, and automatic means to permit and prevent the operation of the escapements as the magazine is inserted in and removed from the machine, respectively.

29. In a typographical machine, a removable magazine provided with escapements and a movable locking device for the escapements, together with means to hold the locking device in its active position when the magazine is removed, said means being automatically released by the replacement of the magazine.

30. In a typographical machine, the magazine A provided with the escapements E, the movable rock shaft C to lock the escapements and the spring-pressed locking plunger $F^{13}$ to engage directly with the rock shaft.

31. In a typographical machine, the combination of a support, a magazine mounted to slide forwardly thereon, and a manually operable locking bar to hold the magazine in position on the support and retractable at will to permit it to slide forwardly thereon, the said magazine being provided with a stop shoulder to engage the bar while standing in its retracted position so as to be arrested thereby, for the purpose described.

32. In a typographical machine, the combination of a magazine provided with two stop shoulders located at different points in the length of the magazine and out of alinement with each other, a support for the magazine, and a movable locking bar extended to one side of the magazine so as to be manually operable and adapted to engage one or another of said stop shoulders so as to hold the magazine in different positions on the support.

33. In a typographical machine, the combination of a magazine provided with two stop shoulders located at different points in its length and out of alinement with each other, a support whereon the magazine is slidably mounted, and a locking bar mounted freely on the support and arranged in engagement with the lowermost shoulder of the magazine to hold it in normal position thereon, the said bar being retractable at will to disengage said shoulder and permit the magazine to slide forwardly on the support, and the said bar adapted to be set in its retracted position to engage the rearmost shoulder on the magazine so as to arrest and hold the latter in abnormal position on the support.

34. In a typographical machine, the combination of a magazine, a support therefor, two stop shoulders mounted on one of said parts and located at different points in the length of the magazine but out of alinement with each other, and a freely movable locking bar mounted on the other of said parts and adapted to be set in different longitudinal positions so as to engage one or the other of said stop shoulders and thus to hold the magazine in different positions on the support.

35. In a typographical machine, the combination of a magazine, assembling devices, and a rigid supporting frame therefor movable to and from operative position, the said rigid frame and magazine being relatively formed so as to interlock with each other when the frame is in its operative position to insure the proper registration of the magazine and the assembling devices carried by the frame.

36. In a typographical machine, the combination of a magazine, assembling devices, and a rigid supporting frame therefor movable to and from operative position, the said frame being provided with fixed projections to engage the magazine when the frame is in its operative position and thus effect the proper registration of the magazine with the assembling devices carried by the frame.

37. In a typographical machine, the combination of a plurality of magazines, and a front plate supported independently of the magazines and movable into and out of operative relation thereto, and having a corresponding plurality of entrance throats coöperating with the magazines, and registering and supporting lugs or projections fixed to the rigid framework of the front plate to engage the magazines as it is moved into its operative position so as to hold the magazines in proper relation to the entrance throats.

38. In a typographical machine, the combination of the magazine A provided with the recess $G^4$ in its lower end, and the movable front plate provided with the beveled lugs or projection $G^3$ fixed to the rigid framework thereof to engage the recesses of the magazine so as to register and support it in proper position.

39. In a typographical machine, the combination of a plurality of magazines, a channeled raceway having a throat to register with one of the magazines and provided with a movable flap to open and close the passage between the throat and the raceway, and a supporting frame for the raceway movably arranged so as to carry it into and out of operative relation to the magazines.

40. In a typographical machine, the combination of a plurality of magazines, a channeled raceway having a throat to register with one of the magazines, and provided with a movable flap to open and close the passage between the throat and the raceway, a movable supporting frame for the raceway, and means whereby the movement of said frame will effect the closing movement of the flap when it is in its open position.

41. In a typographical machine, the combination of a plurality of magazines, a channeled raceway having a throat to register with one of the magazines, and provided with a movable flap to open and close the passage between the throat and the raceway, a movable supporting frame for the raceway, and connections to insure the closing of the flap when the frame is moved from its operative position.

42. In a typographical machine, the combination of a plurality of magazines, a channeled raceway having a plurality of throats to register with the magazines, and provided with movable flaps to open and close the passages between the throats and the raceway, a movable supporting frame for the raceway, means for opening one of the flaps and simultaneously closing the others, and means whereby the movement of the supporting frame from its operative position will effect the closing of the open flap.

43. In a typographical machine, the combination of a plurality of magazines each having a movable matrix locking device, means whereby the movement of one of said locking devices to inactive position effects the movement of the others to active position, a movable frame, and mechanism to insure the return of the inactive locking device to active position when the frame is moved, the said mechanism being also operative manually to effect the return of the locking device independently of the movement of the frame.

44. In a typographical machine, the combination of a plurality of magazines, the series of shiftable magazine-selecting keys B, and the movable locking plate $G^9$ to hold the keys in their shifted position, the said plate being provided with the projecting handle $G^{12}$ to facilitate its manual movement.

45. In a typographical machine, the combination of a plurality of removable magazines, a series of shiftable selecting devices therefor, means for locking said devices in their shifted position, a part movable preparatory to the removal of the magazines, and means controlled by said part to insure the release of the selecting devices.

46. In a typographical machine, the combination of a plurality of removable magazines, a series of shiftable selecting devices therefor, a part movable preparatory to the removal of the magazines, and means controlled by said part to insure the return of said devices to their original position.

47. In a typographical machine, the combination of a plurality of removable magazines each having a series of escapements and a movable locking device therefor, a part movable preparatory to the removal of the magazines, and mechanism controlled by said part to restore all the locking devices to active position before any one of the magazines can be removed.

48. In a typographical machine, the combination of a plurality of removable magazines each having a series of escapements and a movable locking device therefor, mechanism whereby the movement of one of said locking devices to inactive position effects the movement of the others to active position, a part movable preparatory to the removal of the magazines, and mechanism controlled by said part to restore the inactive locking device to active position.

49. In a typographical machine, the combination of a series of escapements, a series of actuating devices therefor, a supporting frame for said devices movable to and from operative position, and means for shifting the actuating devices from their normal position on the frame to prevent their engagement with the escapements when the frame is moved.

50. In a typographical machine, the combination of a series of escapements, a series of actuating devices therefor, a frame upon which the actuating devices are mounted and movable to carry them into and out of operative relation to their escapements, and means for shifting the said actuating devices relatively to the frame in its aforesaid movements.

51. In a typographical machine, the combination of a series of escapements, a series of actuating devices therefor, a movable supporting frame upon which said devices are mounted, and means for shifting the actuating devices from normal position on the frame during its movement and for allowing them to return to normal position upon the completion of its movement.

52. In a typographical machine, the combination of a series of escapements, a series of actuating devices engaged therewith, a movable supporting frame for said devices, and means whereby the movement of the frame will shift the actuating devices longitudinally thereon to break their engagement with the escapements.

53. In a typographical machine, the combination of a series of escapement actuating devices, a supporting frame therefor movable to and from operative position, and means for shifting the actuating devices from their normal position on the frame as it is moved to and from its operative position.

54. In a typographical machine, the combination of the series of escapement actuating devices $E^3$ movable to and from operative position and each provided with the cam-shaped arms $E^{20}$, a movable supporting frame whereon said devices are mounted, and the stationary bar $E^{30}$ to engage said arms as the actuating devices are moved to their operative position.

55. In a typographical machine, the combination of a magazine, a bank of escapements movable out of operative relation thereto, a locking device for the escapements, and automatic means for holding the locking device in its active position when the escapements are moved out of operative relation to the magazine.

56. In a typographical machine, the combination of a magazine, a bank of escapements detachably connected thereto, a locking device for the escapements, and automatic means for holding the locking device in its active position when the escapements are detached from the magazine.

57. In a typographical machine, the combination of a magazine, a bank of escapements movable out of operative relation thereto, and means actuated by the movement of said escapements for locking them against operation.

58. In a typographical machine, the combination of a removable magazine provided with a bank of escapements, a movable locking device therefor, and automatic means for holding the locking device in its active position when the magazine is removed.

59. In a typographical machine, the combination of a plurality of magazines, a series of independently operable magazine selecting devices, means for locking said devices in their operated position, a movable part of the machine, and mechanism controlled by said part for effecting the release of the operated selecting devices.

60. In a typographical machine, the combination with a plurality of magazines, escapement mechanism for all the magazines, a single series of actuating members for the escapement mechanism, and a movable supporting frame carrying the actuating members, of locking devices, one for each magazine, to retain the type or matrices therein, and automatic mechanism to insure the locking of the matrices in all the magazines so as to permit the movement of the supporting frame without spilling the matrices from the magazines.

61. In a typographical machine, the combination of a plurality of magazines each having a series of escapements and a locking device therefor, a common series of actuating members connected to the escapements, a movable supporting frame carrying the actuating members, and automatic mechanism to insure the locking of the escapements of all the magazines so as to permit the movement of the supporting frame without spilling the matrices from the magazines.

62. In a typographical machine, the combination of a plurality of magazines each having a series of escapements, a common series of actuating members connected to the escapements of the several series, locking devices, one for each magazine, to hold the escapements against operation, means whereby the movement of one of the locking devices to inactive position effects the movement of another to active position, a movable supporting frame carrying the escapement actuating members, and automatic mechanism to insure the locking of the active series of escapements so as to permit the movement of the supporting frame without spilling the matrices from the magazines.

63. In a typographical machine, the combination of a plurality of magazines each having a series of escapements, a common series of actuating members connected to the escapements of the several magazines, a movable supporting frame carrying the actuating members, and automatic mechanism to maintain the actuating members in an abnormal position on the frame so as to permit the movement of the latter from operative position without interference with the escapements.

64. In a typographical machine, the combination of a plurality of magazines each having a series of escapements, a common series of actuating members connected to the escapements of all the magazines, a movable supporting frame carrying the actuating members, and means for shifting the actuating members longitudinally with reference to the frame, for the purpose described.

65. In a typographical machine, the combination with a plurality of magazines each having a locking device for the type or matrices, escapement mechanism for all the magazines, a single series of actuating members connected to the escapement mechanism, and a supporting frame for the actuating members, of means for shifting the actuating members relatively to the supporting frame to break their operative connection with the escapement mechanism, and means to insure the locking of the type or matrices in all the magazines when the actuating members are so shifted.

66. In a typographical machine, the combination of a plurality of magazines each having a series of escapements and a locking device therefor, a common series of actuating members connected to the escapements of all the magazines, a supporting frame for the actuating members, means for shifting the actuating members relatively to the supporting frame to break their operative connection with the escapements, and mechanism to insure the locking of the escapements of all the magazines when the actuating members are so shifted.

67. In a typographical machine, the combination of a plurality of magazines each provided with a series of escapements and with a movable locking device therefor, means for moving one of said locking devices to inactive position independently of the others, a series of actuating devices common to the several series of escapements, mechanism for shifting the actuating devices out of operative relation to the escapements, and means whereby the shifting of said actuating devices will restore the said locking device to active position.

68. In a typographical machine, the combination of a plurality of magazines each having a locking device for the type or matrices, escapement mechanism for all the magazines, a single series of actuating members connected to the escapement mechanism, means for disconnecting the actuating members from the escapement mechanism, and mechanism to insure the locking of the type or matrices in all the magazines when the escapement mechanism and the actuating members are disconnected.

69. In a typographical machine, the combination of a plurality of magazines each having a series of escapements and a locking device therefor, a common series of actuating members connected to the escapements of all the magazines, means for disconnecting the actuating members from the escapements, and mechanism to insure the locking of the escapements of all the magazines when their actuating members are disconnected therefrom.

70. In a typographical machine, the combination of a plurality of magazines, a channeled raceway having a throat to register with one of the magazines, and provided with a movable flap to open and close the passage between the throat and the raceway, a movable supporting frame to carry the raceway out of operative relation to the magazines, and automatic mechanism to insure the closing of the flap when the raceway is out of operative relation to the magazines.

In testimony whereof I have affixed my signature in presence of two witnesses.

DAVID S. KENNEDY.

Witnesses:
ALFRED W. F. GUEST,
MARY BRANDT.